US005088067A

United States Patent [19]

Sullivan et al.

[11] Patent Number: 5,088,067

[45] Date of Patent: Feb. 11, 1992

[54] WATER-ACTIVATED SONOBUOY SYSTEM

[75] Inventors: Edmund J. Sullivan, Middletown; James R. Moden, Bristol, both of R.I.

[73] Assignee: The United States of America as represented by the Secretary of the Navy, Washington, D.C.

[21] Appl. No.: 692,870

[22] Filed: Apr. 29, 1991

[51] Int. Cl.[5] .......... H04B 1/59

[52] U.S. Cl. .......... 367/4

[58] Field of Search .......... 367/4, 3; 114/326; 441/33

[56] References Cited

U.S. PATENT DOCUMENTS 3,248,689 4/1966 Shomphe et al. .......... 367/4

*Primary Examiner*—Daniel T. Pihulic

*Attorney, Agent, or Firm*—Michael J. McGowan; Prithvi C. Lall; Michael F. Oglo

[57] ABSTRACT

A water-activated sonobuoy system is provided to release a plurality of simple, water-activated sound sources into a water environment. In the preferred embodiment, a plurality of water-impenetrable tubes are attached and sealed at one end to a float and are open on their other end. A plurality of water-activated sound sources are stored within each tube. Water-degradable barriers are used to isolate each of the sound sources within the tubes. Water-degradable endcaps are used to seal the open end of each tube. Upon being placed in the water, the endcaps dissolve to release the first sound source in each tube. This in turn exposes the first barrier in the tube to water. Each exposed barrier subsequently dissolves in the water to release the next water-activated sound source in each tube. This process continues until all sound sources have been released into the water. Appropriate venting is provided in both the barriers and the float to permit controlled water entry from the bottom of the tubes.

17 Claims, 1 Drawing Sheet

WATER-ACTIVATED SONOBUOY SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to sonobuoys and more particularly to a water-activated sonobuoy system.

(2) Description of the Prior Art

An active sonobuoy is one that transmits an acoustic signal into the surrounding water environment. Typically, it is desirable to produce a plurality of acoustic signals over a period of time. To do so, state-of-the-art active sonobuoys contain an array of active transducers which are driven electronically by means of a signal generator, a power source and an electronic driver stage. The power source, i.e., a battery, provides the power to operate the signal generator and the electronic driver. The signal generator produces a signal of a prescribed configuration that is amplified at the driver stage to drive the array of active transducers. Each active transducer produces an acoustic signal that is propagated into the water. The duration and period of repetition of the acoustic signal is determined by the signal generator. The disadvantages of these electronically driven active sonobuoy systems include their complexity, cost and reliability in hostile environments.

Unfortunately, replacing the array of active electronics transducers with simple (mechanical or explosive) sound sources brings about another set of obstacles. Namely, since these simple sound sources can only generate a "single" (ping or explosion) acoustic signal, it is necessary to provide means for controlling the deployment of a plurality of the sound sources over a period of time.

SUMMARY OF THE INVENTION

Accordingly, it is an object of the present invention to provide an active sonobuoy system that deploys simple sound sources in an underwater environment.

Another object of the present invention is to provide an active sonobuoy system for the deployment of simple sound sources in an underwater environment such that the deployment means is of simple design, low cost and high reliability.

Yet another object of the present invention is to provide an active sonobuoy system capable of periodically transmitting acoustic signals into an underwater environment without electronics.

Other objects and advantages of the present invention will become more obvious hereinafter in the specification and drawings.

In accordance with the present invention, a water-activated sonobuoy system is provided. A plurality of water impenetrable tubes are attached to, and in vented communication with, a float that is vented to the atmosphere. One end of each tube is open such that a plurality of water-activated sound sources may be stored within each of the tubes. Water-degradable barriers, having small ventholes passing therethrough, are provided between each sound source to isolate each of the sound sources from one another. A solid, water-degradable endcap is used to seal the open end of each tube. When the water-activated sonobuoy system is placed in water, each endcap dissolves to release the first water-activated sound source from each tube into the water. This in turn exposes the first water-degradable barrier within each tube to the water. The barrier ventholes allow for a controlled entry of water into each tube and permit the entrapped air in each tube to escape into the float and then into the atmosphere. Like each endcap, each exposed barrier dissolves to release the next sound source. The process repeats itself until all sound sources have been released into the water.

BRIEF DESCRIPTION OF THE DRAWING(s)

FIG. 1(*b*) is an enlarged sectional view of one of the tubes in FIG. 1(*a*) showing the barrier ventholes.

DESCRIPTION OF THE PREFERRED EMBODIMENT(s)

Figure 1A:
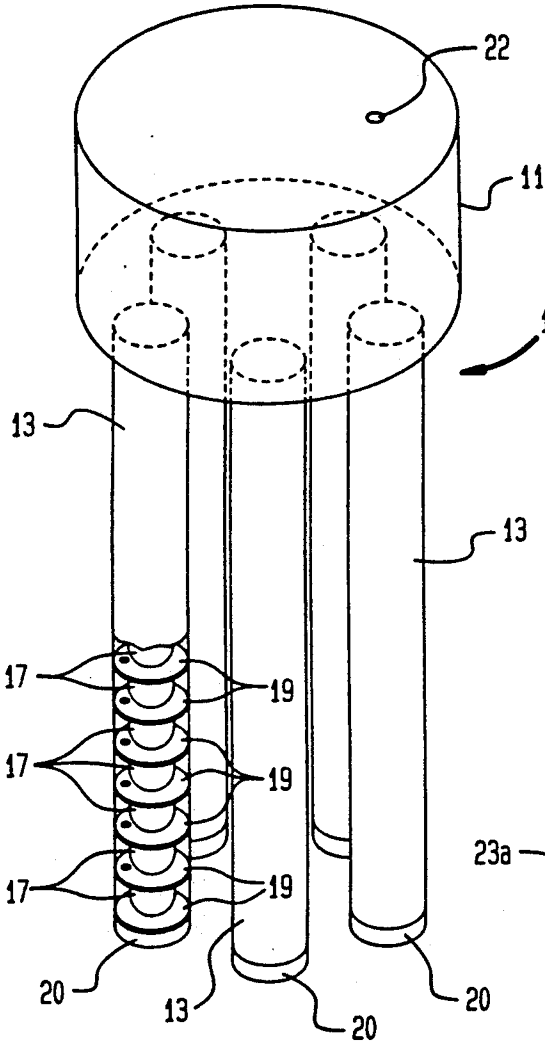
FIG. 1(*a*) is a perspective view of a preferred embodiment of the water-activated sonobuoy system according to the present invention.
Figure 1B:
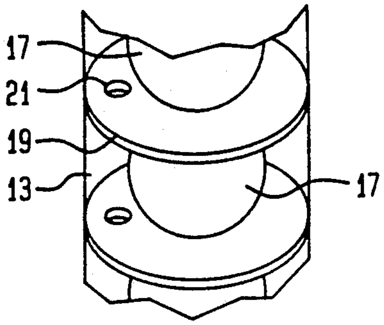

Referring now to the drawings, and in particular to FIG. 1(*a*), a preferred embodiment of the water-activated sonobuoy system of the present invention is designated generally by the numeral 10. System 10 provides a means to generate a series of acoustic signals in an underwater environment. While the following description will focus on the preferred embodiment shown in FIG. 1(*a*), it will be apparent that numerous design variations are possible that encompass the novel aspects of the present invention. Indeed, several of these variations will be noted by applicant hereinbelow.

Figure 2:
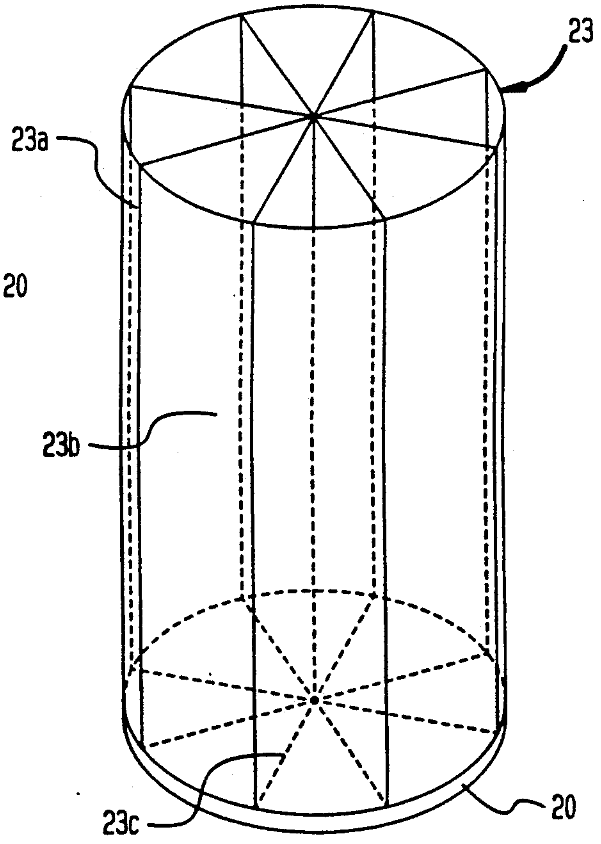
FIG. 2 is a perspective view of a single, compartmentalized tube arrangement that may be used as an alternative to the plurality of tubes shown in FIG. 1(*a*).

The component parts of system 10 include a float 11, having a plurality of tubes 13 attached and sealed thereto, such that no water may enter tubes 13 through or at the juncture with float 11. Tubes 13 are constructed of any water-impenetrable material. Five tubes are shown for purposes of illustration only. The actual number of tubes used may be one, or as many as needed, and is merely a choice of design. Furthermore, individual tubes may be replaced by a single, compartmentalized tube 23 shown in FIG. 2. Tube 23 could contain a plurality individual tube sections **23*a*, 23*b*, 23*c*, etc. such that adjacent tube sections share a common, water-impenetrable wall. Typically, tube 23 would then be attached to a float (not shown) similar to float 11** in FIG. 1(*a*).

For visual clarity, continued reference will again be made to FIG. 1(*a*) where one tube 13 is partially cut away to reveal a plurality of sound sources 17 within tube 13. It is to be understood that the structure and operation of each tube 13 is similar to that being described for a single tube. The number of sound sources 17 used in each tube 13 is a design choice and in no way limits the present invention. The type of sound source used is also a design choice and may encompass one of many conventional sound sources. For example, each sound source 17 may be an inexpensive explosive sound source having a depth sensitive detonator. Alternatively, a conventional mechanical sound source may be used.

Each sound source 17 is held in place and isolated within tube 13 by a barrier 19. Barrier 19 is made from a water-degradable material for reasons that will become more apparent hereinafter. Each tube 13 is sealed at its open end with a solid endcap 20. Endcap 20 is similarly made from a water-degradable material.

In operation, when the active sonobuoy system 10 is placed into the water, the buoyant force provided by float 11 will keep system 10 afloat at the water's surface. Typically, a portion of float 11 will remain exposed to the air above the water's surface. It is in this portion that a venthole 22 is provided therethrough for reasons to be explained hereinbelow. The amount of buoyant force, and hence the size of float 11, is a design choice based on the particular application.

As any endcap 20 dissolves in the water, the first sound source 17 from the respective tube 13 is released into the water. In order for the water to displace the air trapped within each tube 13, an air escape means must be provided. Accordingly, each barrier 19 is provided with a venthole 21 as shown in the enlarged sectional view of tube 13 in FIG. 1(*b*). (While not shown, similar ventholes would be required for the barriers used in the compartmentalized tube arrangement shown in FIG. 2.) Since the size of venthole 21 determines the rate at which water rises within tube 13, its dimension is purely a design consideration.

Each tube 13 must further be in vented communication with the atmosphere to allow the entrapped air to leave each tube 13 as the water rises. In the preferred embodiment, each tube 13 is in vented communication with float 11 which, as mentioned above, is vented to the air above the water's surface via venthole 22. It is by this process that the first barrier 19 is thus exposed to the water. When the first barrier 19 dissolves, the next sound source in tube 13 is released into the water via the tube's open end. This process continues until all of the sound sources from each tube 13 have been released into the water.

The time required to release the first and subsequent sound sources 17 from each tube 13 into the water is approximately proportional to the thickness and properties of the material used for both the endcap 20 and individual vented barriers 19, respectively. The thickness of each endcap 20 may be varied from tube to tube to create a sequential release of the sound sources 17. After one skilled in the art selects a particular material, testing is done to correlate thickness and the time required to dissolve same. In this way, the timing of the acoustic signals transmitted by the sound sources can be predetermined.

The material used for both endcap 20 and barriers 19 should be a water-degradable material that can support the weight of the sound sources 17 within tube 13 and, at the same time, not deteriorate in its stored dry condition. One such material is poly (ethyleneoxide) which is well known in the art to be one of a class of water-soluble, long-chain polymers. Poly (ethyleneoxide) will react in both fresh and salt water environments. Alternatively, a bimetallic material could substituted for the poly (ethyleneoxide) in a salt water environment. Such a material would corrode electrochemically in the salt water.

The advantages of the present invention are numerous. The water-activated sonobuoy is less complex than the current electrically driven active sonobuoys. It is simple and inexpensive to manufacture and can be dry stored for long periods of time since none of its components are subject to dry storage deterioration. The timing of the acoustic signals is controlled by the water-degradable material used to seal and isolate each of the sound sources within the respective tubes.

While the present invention has been described relative to the preferred embodiment, it is not so limited. For example, there may be applications that do not require a float. In such a case, a single water-impenetrable tube or receptacle might be used to encase one or more water-activated sound sources. For example, the compartmentalized tube 23 shown in FIG. 2 might be used without a float. Operation of such a device would be the same as that described above for the preferred embodiment. Another alternative would be to construct the system using one type and thickness of water-degradable material for the endcaps and another type and thickness for the barriers. Such a system could thus be precisely tailored for a very specific timing of acoustic signals.

Accordingly, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A water-activated sonobuoy system, comprising:
at least one water-activated sound source; and
means for encasing said sound source wherein said encasing means reacts with water such that said sound source is released into the water, said encasing means comprising, a first encasement portion being impenetrable by water, and a second encasement portion being degradable in water.

2. A system as in claim 1 wherein said second encasement portion is water-soluble, long-chain polymer.

3. A system as in claim 2 wherein said water-soluble, long-chain polymer is poly (ethyleneoxide).

4. A system as in claim 1 wherein the water is salt water and said second encasement portion is a bimetallic material.

5. A system as in claim 1 further including a float vented to the atmosphere and attached to said encasing means for maintaining said sonobuoy system afloat at the water's surface, said encasing means further being in vented communication with said float whereby said encasing means is vented to the atmosphere.

6. A water-activated sonobuoy system, comprising:
a float vented to the atmosphere for maintaining said sonobuoy system afloat at the water's surface;
a plurality of water impenetrable tubes attached to and in vented communication with said vented float, said tubes being open on one end;
a plurality of water-activated sound sources stored within each of said tubes;
a plurality of water degradable barriers within each of said tubes for isolating each of said sound sources within each tube, wherein each of said barriers is provided with a venthole passing therethrough; and
a water degradable endcap for sealing the open end of each tube.

7. A system as in claim 6 wherein said water degradable barriers comprise a water-soluble, long-chain polymer material.

8. A system as in claim 7 wherein said material is poly (ethyleneoxide).

9. A system as in claim 6 wherein said water degradable endcap comprises a water-soluble, long-chain polymer material.

10. A system as in claim 9 wherein said material is poly (ethyleneoxide).

11. A system as in claim 6 wherein the water is salt water and said water degradable barriers comprise a bimetallic material.

12. A system as in claim 6 wherein the water is salt water and said water degradable endcap comprises a bimetallic material.

13. A water-activated sonobuoy system, comprising:

a water impenetrable receptacle having at least one open end;

a plurality of water-activated sound sources stored within said receptacle;

means for isolating each of said sound sources within said receptacle and for sealing said open end of said receptacle, wherein said isolating and sealing means react with water to periodically release said sound sources into the water through said open end of said receptacle, said isolating means further including venting means for releasing air trapped within said receptacle into the atmosphere as said isolating means reacts with water.

14. A system as in claim 13 further including means for maintaining said system afloat at the water's surface.

15. A system as in claim 13 wherein said isolating and sealing means comprise a water-soluble, long-chain polymer material.

16. A system as in claim 15 wherein said material is poly (ethyleneoxide).

17. A system as in claim 13 wherein the water is salt water and said isolating and sealing means comprises a bimetallic material.

* * * * *